(12) United States Patent  (10) Patent No.: US 10,369,688 B2
Koegel                    (45) Date of Patent: Aug. 6, 2019

(54) SUPPORT FRAME FOR BENCHTOP POWER TOOL

(71) Applicants: Robert Bosch GmbH, Stuttgart (DE); Robert Bosch Tool Corporation, Broadview, IL (US)

(72) Inventor: Jan Koegel, Freudenstadt (DE)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/533,908

(22) PCT Filed: Dec. 9, 2015

(86) PCT No.: PCT/US2015/064740
§ 371 (c)(1),
(2) Date: Jun. 7, 2017

(87) PCT Pub. No.: WO2016/094532
PCT Pub. Date: Jun. 16, 2016

(65) Prior Publication Data
US 2017/0361451 A1  Dec. 21, 2017

Related U.S. Application Data

(60) Provisional application No. 62/089,698, filed on Dec. 9, 2014.

(51) Int. Cl.
| F16M 1/00 | (2006.01) |
| B25H 1/00 | (2006.01) |
| B23D 45/06 | (2006.01) |
| B23D 47/02 | (2006.01) |
| B25H 1/04 | (2006.01) |

(52) U.S. Cl.
CPC ............. B25H 1/005 (2013.01); B23D 45/06 (2013.01); B23D 47/02 (2013.01); B23D 47/025 (2013.01); B25H 1/04 (2013.01)

(58) Field of Classification Search
CPC ...... B23D 45/06; B23D 47/02; B23D 47/025; B25H 1/005
USPC ........................ 248/672; 269/1, 4; 108/51.11
See application file for complete search history.

(56) References Cited

U.S. PATENT DOCUMENTS

| 2005/0093258 A1* | 5/2005 | Brazell .................... B25H 1/04 280/30 |
| 2011/0011231 A1 | 1/2011 | Frolov |
| 2012/0006170 A1 | 1/2012 | Frolov et al. |

(Continued)

OTHER PUBLICATIONS

International Search Report corresponding to PCT Application No. PCT/US2015/064740, dated Apr. 1, 2016 (3 pages).

*Primary Examiner* — Todd M Epps
(74) *Attorney, Agent, or Firm* — Maginot Moore & Beck LLP (57) ABSTRACT

A support frame for a power tool includes a top configured to support a table top and a bottom arranged opposite and parallel to the top. The bottom is configured to support the support frame on a surface when the support frame is in a first position. The support frame further includes a side arranged between the top and the bottom and configured to support the support frame on the surface when the support frame is in a second position. When the support frame is in the first position and the second position, the table top is spaced apart from the surface.

16 Claims, 11 Drawing Sheets

(56) References Cited

U.S. PATENT DOCUMENTS

2012/0318940 A1* 12/2012 Chen .................. B25H 1/04
                                                                248/164
2013/0098217 A1* 4/2013 Welsh ................ B23D 47/025
                                                                 83/473

* cited by examiner

SUPPORT FRAME FOR BENCHTOP POWER TOOL

CLAIM OF PRIORITY

This application is a 35 U.S.C. § 371 National Stage Application of PCT/US2015/064740, filed on Dec. 9, 2015, which claims priority to U.S. Provisional Patent Application No. 62/089,698, which is entitled "Support Frame for Benchtop Power Tool," and was filed on Dec. 9, 2014. The disclosures of the above-identified patent applications are both incorporated by reference herein in their entirety.

TECHNICAL FIELD

This disclosure relates generally to power tools, and, more particularly, to portable benchtop power tools.

BACKGROUND

Portable benchtop power tools are often used in the construction industry. In particular, at a construction jobsite where workers cut and shape a large number of wood products portable benchtop power tools are used. For example, framers use portable table saws for rough-cutting lumber, while finishing carpenters use portable power saws capable of making rip and miter cuts for producing precise finishing cuts of trim pieces.

In the construction industry it is commonplace for the workers to transport their benchtop power tools from one construction site to another. In doing so, the benchtop power tools may be placed in a transport vehicle, e.g., bed of a pickup truck, alongside of other tools. The benchtop power tools have to be compact to take a small space and be easy to store. Often the benchtop power tools are roughly handled by the worker during placement of the benchtop power tools into the transport vehicle.

In addition, during transport the benchtop power tools may be knocked around and collide with the other tools. For example, during transport of the benchtop power tools from one location to another, the benchtop power tools may slide around in the bed of a pickup truck and collide with the bed walls and/or tailgate of the truck. Such collisions may be detrimental to certain components of the benchtop power tools. In particular, the benchtop power tools may have table top surfaces, and other components that extend from the front side and back side of the benchtop power tools which may be damaged during such collisions. Therefore, one desirable feature of a benchtop power tool is durability during loading and transport from one job site to another including protecting such benchtop power tool table top surfaces and other similarly situated components.

Once at the jobsite, the workers grasp the benchtop power tools by a handle for transferring from the transport vehicle to the jobsite. The benchtop power tools may be bulky and heavy. The benchtop power tools may have concentrations of mass, e.g., due to a heavy motor, at various positions within the body of the tools. These concentrations of mass may cause the benchtop power tools to be awkward to carry during transfer. Therefore, transfer of the benchtop power tools from the transport vehicle to the jobsite may be difficult and requires two hands. Thus, another desirable feature for benchtop power tools is ease of transfer from the transport vehicle to the jobsite.

The benchtop power tools may have several accessories that can be attached thereto. For example, a blade guard is typically included with a table saw. An anti-kickback device and a push stick are other commonplace accessories that are included with a table saw. Yet another accessory that is typically included with a table saw is a rip fence that is coupled to rails of the power saw.

A typical issue for the workers with respect to these accessories is keeping the accessories in a place where they are easily retrievable. However, often times, these accessories are left at job sites and thereby lost. Therefore, another desirable feature of benchtop power tools is to provide convenient stowage capabilities for the accessories and protect them from damage.

SUMMARY

A support frame configured to support a table top of a power tool is disclosed herein. The support frame includes a top configured to support a table top and a bottom arranged opposite and parallel to the top. The bottom is configured to support the support frame on a surface when the support frame is in a first position. The support frame further includes a side arranged between the top and the bottom and configured to support the support frame on the surface when the support frame is in a second position. When the support frame is in the first position and the second position, the table top is spaced apart from the surface.

A power tool including a support frame and a table top is disclosed herein. The support frame of the power tool includes a top configured to support the table top and a bottom arranged opposite and parallel to the top. The bottom is configured to support the support frame on a surface when the support frame is in a first position. The support frame also includes a side arranged between the top and the bottom and configured to support the support frame on the surface when the support frame is in a second position. When the support frame is in the first position and the second position, the table top is spaced apart from the surface

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
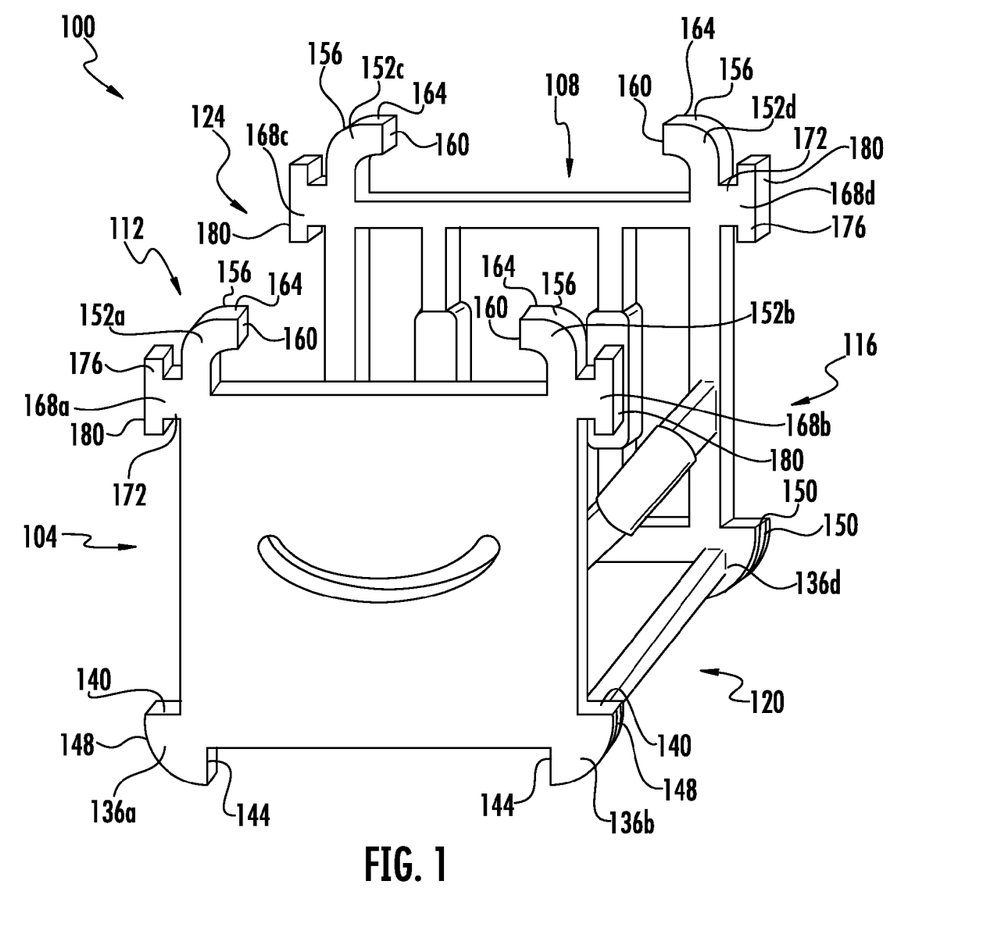
FIG. 1 is a front perspective view of a single piece benchtop power tool support frame according to the disclosure.

The terms "left," "right," "front," "rear," "top" or "upper," and "bottom" or "lower," "vertical," and "horizontal" are used herein for clarity of description. Unless otherwise noted, the directional terms are used with reference to the corresponding directions as seen in the view of FIG. 1. It should be appreciated that no limitation is intended by the use of these directional terms with respect to the orientations at which the assembly may be positioned.

Figure 3A:
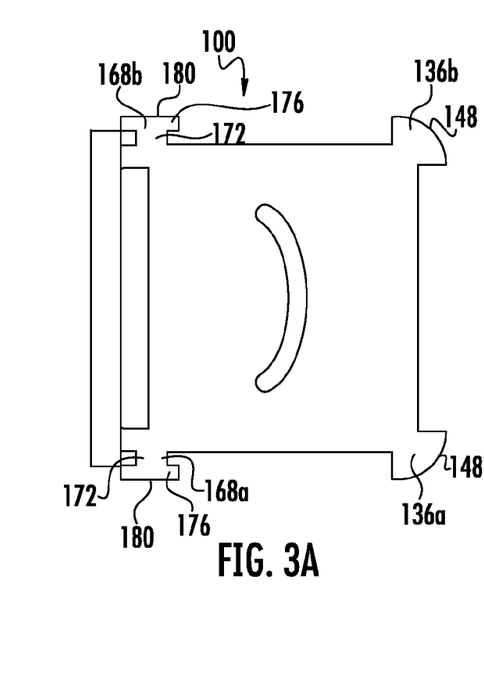
FIG. 3A is a front elevational view of the benchtop power tool support frame of FIG. 1 in a first rotated position with a table top affixed to the benchtop power tool support frame.
Figure 3B:
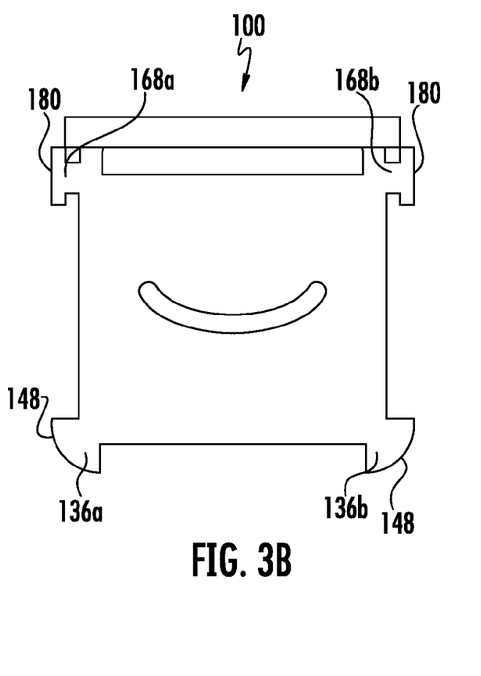
FIG. 3B is a front elevational view of the benchtop power tool support frame of FIG. 1 in an upright position with a table top affixed to the benchtop power tool support frame.
Figure 3C:
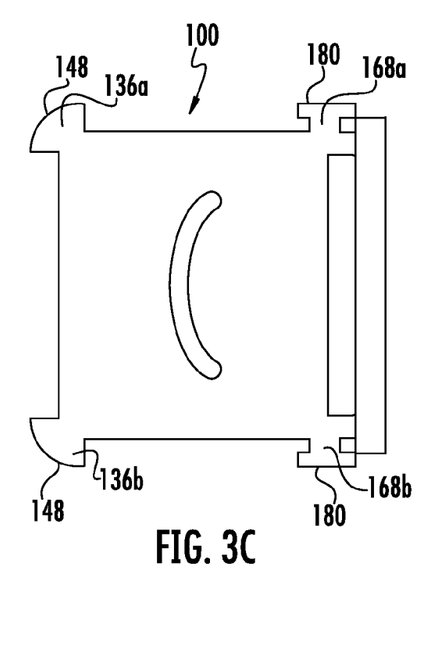
FIG. 3C is a front elevational view of the benchtop power tool support frame of FIG. 1 in a second rotated position with a table top affixed to the benchtop power tool support frame.

Referring to FIG. 1, a benchtop power tool support frame 100 is depicted. The support frame 100 is formed as a single, unitary piece and is configured to support a conventional benchtop power tool table top 102 (as shown in FIGS. 3A-3C). The support frame 100 is made substantially out of a rigid, durable material, such as, for example, a hard plastic or a lightweight metal. The support frame 100 can be formed by, for example, injection molding, die casting, or structural foam molding.

The support frame 100 is shaped substantially as a rectangular prism having a front 104, a rear 108 arranged opposite and parallel to the front 104, a left side 112 arranged between and perpendicular to the front 104 and the rear 108, and a right side 116 arranged opposite and parallel to the left side 112 and also between and perpendicular to the front 104 and the rear 108. The support frame 100 also has a bottom 120 connected to, and perpendicular to each of, the front 104, the rear 108, the left side 112, and the right side 116. The support frame 100 also has a top 124 arranged opposite and parallel to the bottom 120. The dimensions of the front 104, rear 108, left side 112, right side 116, bottom 120, and top 124 shown in the figures are for illustrative purposes only. The support frame 100 can have any dimensions that will allow the support frame 100 to function as a benchtop power tool support frame 100 as described herein.

Support frame 100 also includes four feet 136a, 136b, 136c (shown in FIG. 2D), and 136d, located at the four corners of the bottom 120 of the support frame 100. Foot 136a is located at the intersection of the front 104, the left side 112, and the bottom 120 of the support frame 100, and projects leftwardly and downwardly therefrom. Foot 136b is located at the intersection of the front 104, the right side 116, and the bottom 120 of the support frame 100, and projects rightwardly and downwardly therefrom. Foot 136c (shown in FIG. 2D) is located at the intersection of the rear 108, the left side 112, and the bottom 120 of the support frame 100, and projects leftwardly and downwardly therefrom. Foot 136d is located at the intersection of the rear 108, the right side 116, and the bottom 120 of the support frame 100, and projects rightwardly and downwardly therefrom. The feet 136a, 136b, 136c, 136d support the support frame 100 when the support frame 100 is in an upright position (shown in FIG. 3B).

Each foot 136a, 136b, 136c, 136d includes an outward edge 140, which projects outwardly, from the left side 112 in the case of 136a and 136c, and from the right side 116 in the case of 136b and 136d. Each foot 136a, 136b, 136c, 136d also includes a downward edge 144, which projects downwardly from the bottom 120, and a curved edge 148, which connects the outward edge 140 and the downward edge 144 with an arced shape. The feet 136a, 136b, 136c, 136d are so arranged so that the support frame 100 can pivot on the curved edge 148 and transition from the upright position (shown in FIG. 3B) to a first rotated position (shown in FIG. 3A) and a second rotated position (shown in FIG. 3B) to enable portage and storage of the benchtop power tool support frame 100. The arced shape of the curved edge 148 extends greater than 90° such that each outward edge 140 is arranged at an obtuse angle relative to its respective downward edge 144. This configuration enables the support frame 100 to rest on the curved edges 148 of the feet 136a, 136b, 136c, 136d rather than resting on an intersection of a curved edge 148 and an outward edge 140 or a curved edge 148 and a downward edge 144. This improves stability of the benchtop power tool support frame 100 both in use as well as in portage and storage. Additionally, this configuration can improve stability of the support frame 100 on uneven surfaces.

Figure 2A:
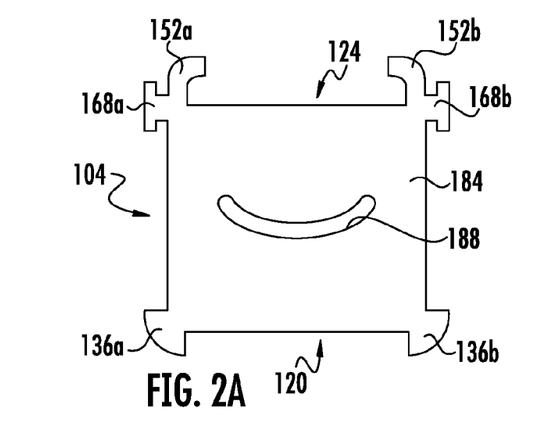
FIG. 2A is a front elevational view of the benchtop power tool support frame of FIG. 1.
Figure 2B:
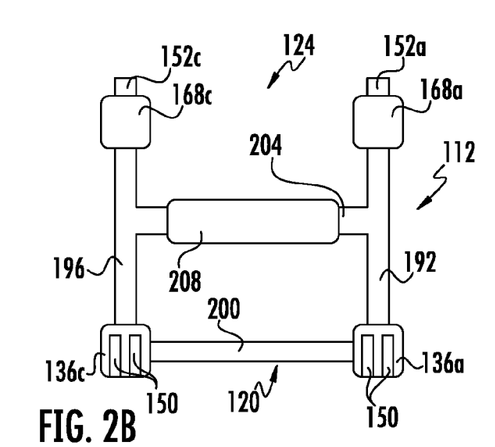
FIG. 2B is a left side elevational view of the benchtop power tool support frame of FIG. 1.
Figure 2C:
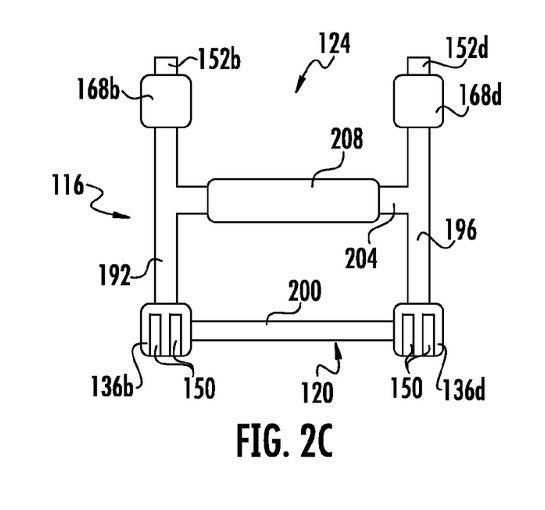
FIG. 2C is a right side elevational view of the benchtop power tool support frame of FIG. 1.

As shown in FIGS. 2B and 2C, each foot 136a, 136b, 136c, 136d also includes at least one structural element 150 formed in the curved edge 148. In at least one embodiment, the structural elements 150 can be notches cut into the curved edge 148 of each foot 136a, 136b, 136c, 136d. In an alternative embodiment, the structural elements 150 can be raised portions projecting outwardly from each foot 136a, 136b, 136c, 136d. In another alternative embodiment, the structural elements 150 can be textured areas formed on the curved edge 148 of each foot 136a, 136b, 136c, 136d. Each structural element 150 is configured to provide friction to the foot 136a, 136b, 136c, 136d to prevent unwanted pivoting of the benchtop power tool support frame 100 on the curved edges 148. In other words, each structural element 150 is configured to increase a coefficient of friction between the foot 136a, 136b, 136c, 136d and the surface on which the benchtop power tool support frame 100 is being rested. Each structural element 150 is further configured to enhance the durability of the curved edges 148.

The support frame 100 also includes table top supports 152a, 152b, 152c, 152d, projecting above the top 124 of the support frame 100, and configured to support a benchtop power tool table top 102 thereon. The table top supports 152a, 152b, 152c, 152d are located at the four corners of the top 124 of the support frame 100 and each projects upwardly and inwardly therefrom. Table top support 152a is located at the intersection of the front 104, the left side 112, and the top 124 of the support frame 100 and projects upwardly and rightwardly. Table top support 152b is located at the intersection of the front 104, the right side 116, and the top 124 of the support frame 100 and projects upwardly and leftwardly. Table top support 152c is located at the intersection of the rear 108, the left side 112, and the top 124 of the support frame 100 and projects upwardly and rightwardly. Table top support 152d is located at the intersection of the rear 108, the right side 116, and the top 124 of the support frame 100 and projects upwardly and leftwardly.

Each of the table top supports 152a, 152b, 152c, 152d includes an outward facing edge 156 which extends from the top 124 of the support frame 100 to an innermost edge 160 of the respective table top support. The outward facing edge 156 is configured to be coupled to the benchtop power tool table top 102 (shown in FIG. 3A-3C) by fastening. For example, the outward facing edge 156 can be screwed or bolted onto the table top 102. By fixing the outward facing edge 156 of each table top support 152a, 152b, 152c, 152d to the table top 102, the benchtop power tool support frame 100 is coupled to, and thereby configured to support, the table top 102. Each outward facing edge 156 includes a flat, upward facing portion 164 which provides a flat surface to which the table top 102 can be coupled. This configuration enhances stability of the table top 102 on the support frame 100 as well as ease of construction.

The support frame 100 also includes support posts 168a, 168b, 168c, and 168d which project outwardly from the left and right sides 112, 116 of the support frame 100. The support post 168a is located at the intersection of the front 104, the left side 112, and the top 124 of the support frame 100 and projects leftwardly. Support post 168b is located at the intersection of the front 104, the right side 116, and the top 124 of the support frame 100 and projects rightwardly. Support post 168c is located at the intersection of the rear 108, the left side 112, and the top 124 of the support frame 100 and projects leftwardly. Support post 168d is located at the intersection of the rear 108, the right side 116, and the top 124 of the support frame 100 and projects rightwardly.

Each of the support posts 168a, 168b, 168c, 168d, includes a neck 172, which extends outwardly from the support frame 100, and a head 176, which is coupled to an end of the neck 172 opposite the support frame 100. Each head 176 has a perimeter which is larger than its respective neck 172 such that the heads 176 project from the necks 172. Each head 176 also has a flat outward surface 180 opposite the respective neck 172. The outward surfaces 180 of the support posts 168a, 168c are configured to support the support frame 100 when the support frame is in the first rotated position (FIG. 3A). The outward surfaces 180 of the support posts 168b, 168d are configured to support the support frame 100 when the support frame is in the second rotated position (FIG. 3C). To this end, the support posts 168a, 168b, 168c, 168d are sized and arranged such that the outward surfaces 180 project outwardly from the support frame 100 to the same extent as the curved edge 148 at the outward edge 140 of each of the feet 136a, 136b, 136c, 136d. In other words, the support frame is configured to rest stably on feet 136a, 136c and support posts 168a, 168c when the support frame 100 is in the first rotated position shown in FIG. 3A, the support frame 100 is configured to rest stably on feet 136a, 136b, 136c, 136d when the support frame 100 is in the upright position shown in FIG. 3B, and the support frame 100 is configured to rest stably on feet 136b, 136d and support posts 168b, 168d when the support frame 100 is in the second rotated position shown in FIG. 3C.

As shown in FIGS. 3A-3C, the support posts 168a, 168b, 168c, 168d are also sized and arranged to prevent the table top from contact with the surface on which the benchtop power tool support frame 100 is being rested. To this end, the necks 172 of the support posts 168a, 168b, 168c, 168d extend outwardly from the support frame 100 at a distance sufficient to position the heads 176 of the support posts 168a, 168b, 168c, 168d outwardly of the edges of the table top. Therefore, when the benchtop power tool support frame 100 is positioned in either of the first and second rotated positions, the feet 136 and the support posts 168 contact the surface rather than the table top. This arrangement protects the table top from damage and prevents shifting of the position of the table top relative to the support frame 100 by contact with the surface on which the support frame 100 is resting.

In at least one embodiment, the support posts 168a, 168b, 168c, 168d can also be configured to support power cords or other flexible portions of the benchtop power tool. For example, a power cord of the power tool can be wrapped around the necks 172 of the support posts 168a, 168c and retained on the necks 172 by the larger heads 176.

In at least one alternative embodiment, the support frame 100 can include only two support posts 168. In this embodiment, the support posts 168 are located on the same side of the support frame 100 to support the support frame 100 in one of the first and second rotated positions, depending on the side on which the support posts 168 are located. In this embodiment, only two of the feet 136 include a curved edge 148 to facilitate rotation of the support frame 100 toward the side of the support frame 100 which includes the support posts 168.

Turning now to FIG. 2A, an elevational view of the front 104 of the support frame 100 is shown. The front 104 includes a front panel 184 having a curved opening 188 formed therein. The front panel 184 extends from the table top supports 152a, 152b and the support posts 168a, 168b at the top 124 of the support frame 100 to the feet 136a, 136b at the bottom 120 of the support frame 100. The curved opening 188 is formed centrally in the front panel 184 and is configured to receive a functional element of a benchtop power tool therein. For example, a bevel adjustment mechanism or a dust chute can be inserted through the curved opening 188 for use with a table saw. In an alternative embodiment, wherein the benchtop power tool does not use an accessory which is received through the curved opening 188, the front panel 184 can be a solid piece with no opening. Alternatively, the front 104 of the support frame 100 can include support members and open space rather than a solid front panel 184.

Turning now to FIGS. 2B and 2C, elevational views of the left and right sides 112, 116 of the support frame 100 are shown. In this embodiment, the left and right sides 112, 116 are identical, so this description applies to both sides. In alternative embodiments, however, the left and right sides 112, 116 need not be identical and can be different to provide different functionality to the support frame 100. Each side of the support frame 100 includes a front support member 192, a rear support member 196, a bottom support member 200, and a horizontal support member 204. In the embodiment shown, the front support member 192 can be the front panel 184. In an alternative embodiment, however, the front support member 192 can be provided by a support member that is separate from the front panel 184. Each of the front support members 192 and rear support members 196 extends from the table top supports 152a-d and the support posts 168a-d at the top 124 of the support frame 100 to the feet 136a-d at the bottom 120 of the support frame 100.

Each bottom support member 200 extends along the bottom 120 of the support frame 100 from a foot 136 at the left side 112 to a foot 136 at the right side 116. Each bottom support member 200 intersects both the front support member 192 and the rear support member 196 at a right angle. Each horizontal support member 204 is arranged above and parallel to a respective bottom support member 200. Thus, each horizontal support member 204 also intersects both the front support member 192 and the rear support member 196 at a right angle. Further, each horizontal support member 204 is arranged between the top 124 and the bottom 120 of the support frame 100 at a position such that when the support frame 100 is assembled with a table top and a benchtop power tool, the horizontal support member 204 is arranged at a center of mass for the assembly calculated from that side. Each horizontal support member 204 includes a handle 208 configured to be gripped by a user to facilitate moving and/or storing the support frame 100 and assembly. Each handle 208 can be integrally formed with the respective horizontal support member 204. Alternatively, the handles 208 can be added or applied to the horizontal support members 204 after the support frame 100 is formed. The handles 208 are positioned along the horizontal support members 204 at the centers of mass of the assembly calculated from the respective side.

Figure 2D:
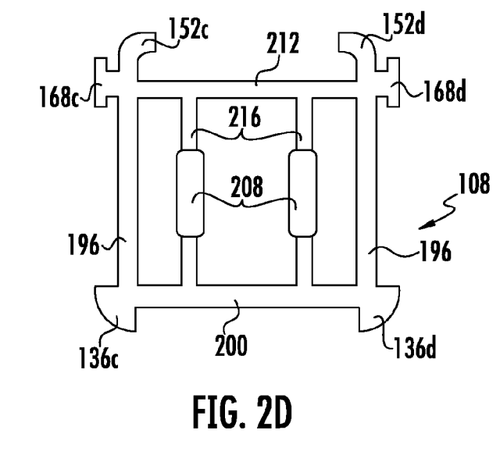
FIG. 2D is a back elevational view of the benchtop power tool support frame of FIG. 1.

Turning now to FIG. 2D, an elevational view of the rear 108 of the support frame 100 is shown. The rear 108 includes the rear support members 196 of the left and right sides 112, 116 of the support frame 100 as well as another bottom support member 200, like those shown on the left and right sides 112, 116 of the support frame 100. The bottom support member 200 intersects both the rear support members 196 at right angles. The bottom support member 200 is also configured to intersect the rear support members 196 at the feet 136c and 136d. The rear 108 further includes a top support member 212 arranged above and parallel to the bottom support member 200. Thus, the top support member 212 intersects both the rear support members 196 at the top 124 of the support frame 100. The top support member 212 is configured to intersect the rear support members 196 at the table top supports 152c and 152d and the support posts 168c and 168d. The rear 108 further includes two vertical support members 216 extending between the bottom support member 200 and the top support member 212. The vertical support members 216 are parallel to, and are spaced between, the rear support members 196. Each vertical support member 216 includes a handle 208 substantially similar to the handles 208 on the horizontal support members 204. The vertical support members 216 are spaced between the rear support members 196 at a spacing such that a center of mass of the assembly calculated from the rear 108 is evenly distributed by the vertical support members 216. Further, the handles 208 are positioned along the vertical support members 216 at the center of mass of the assembly calculated from the rear 108 of the support frame 100.

In at least one embodiment of the present invention, each of the support members can be a hard, plastic piece, for example, a hard plastic rectangular tube. Alternatively, the support members can have a cross-section such as that shown in FIG. 4. More specifically, the support members can have a "T" shaped cross-section including a flat surface 220 and a rib 224 extending therefrom. The rib 224 of the "T" shaped cross-section provides additional support while the flat surface 220 provides flat contact surfaces to facilitate coupling the support frame 100 to other parts of a benchtop power tool. In additional alternative embodiments, the support members can have cross-sections that are "U" shaped, having two ribs that extend downwardly from a flat surface, "E" shaped, having three ribs that extend downwardly from a flat surface, or can be otherwise configured to provide flat contact surfaces to facilitate coupling as well as ribs to provide additional structural support.

Figure 4:
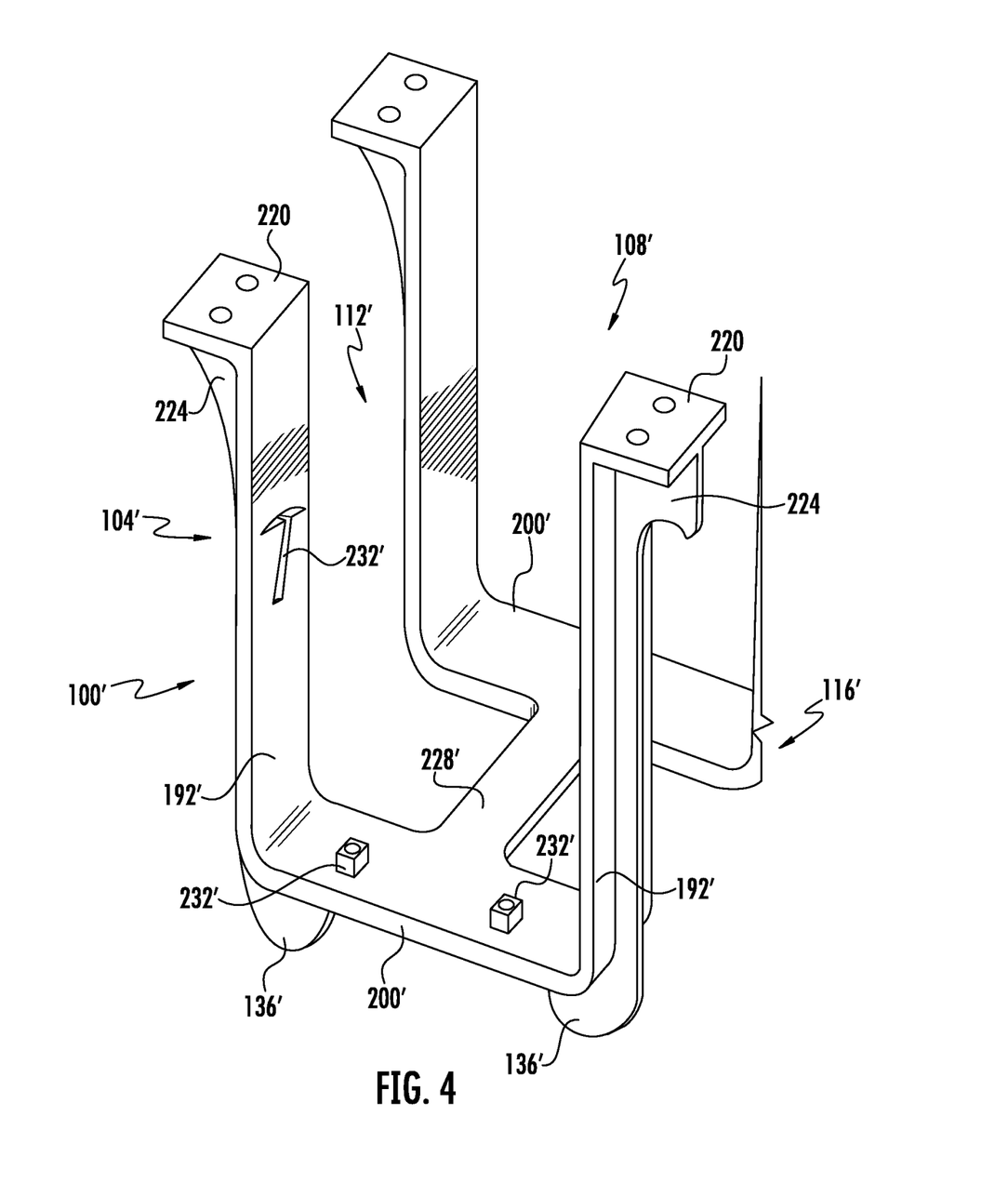
FIG. 4 is a partial top perspective view of another embodiment of a single piece benchtop power tool support frame.

Also shown in FIG. 4, is another embodiment of a support frame 100'. Support frame 100' is substantially similar to support frame 100 in structure and function, however, feet 136' of support frame 100' are narrower and more integrally formed with the support members than the feet 136 of the support frame 100. In particular, the feet 136' extend downwardly from the bottom support member 200' at the intersection of the bottom support member 200' and the front support members 192'. Rather than extending outwardly, however, the feet 136' merge into the front support members 192' providing a smooth transition and an easily formed shape. Additionally, the support frame 100' can have bottom support members 200' along the bottom 120' of the front 104' and rear 108' of the support frame 100', but no bottom support members along the bottom 120' of the left and right sides 112', 116' of the support frame 100'. Instead, the support frame 100' can include a single central bottom support member 228' extending between the bottom support members 200' at the front 104' and rear 108' of the support frame 100'. Additionally, the support frame 100' does not include horizontal or vertical support members on the sides 112', 116' or rear 108' of the support frame 100' and the front 104' does not include a front panel. This configuration is advantageous because relatively little mass is needed to support a benchtop power tool. Additionally, this configuration is relatively easy to form due to its simplicity.

As further shown in FIG. 4, the support frame 100' includes at least one integrated retainer 232' integrally formed with the support frame 100' and configured to retain accessories and other elements of a benchtop power tool assembly. These integrated retainers 232' can be configured to mate with portions of the accessories and elements of the assembly such that the accessories and elements do not become unintentionally separated from the support frame 100' and are less likely to be lost when storing or moving the assembly. For example, the integrated retainers 232' can be configured to retain a saw blade, a wrench, a blade guard, and a power cord of a power table saw.

Figure 5:
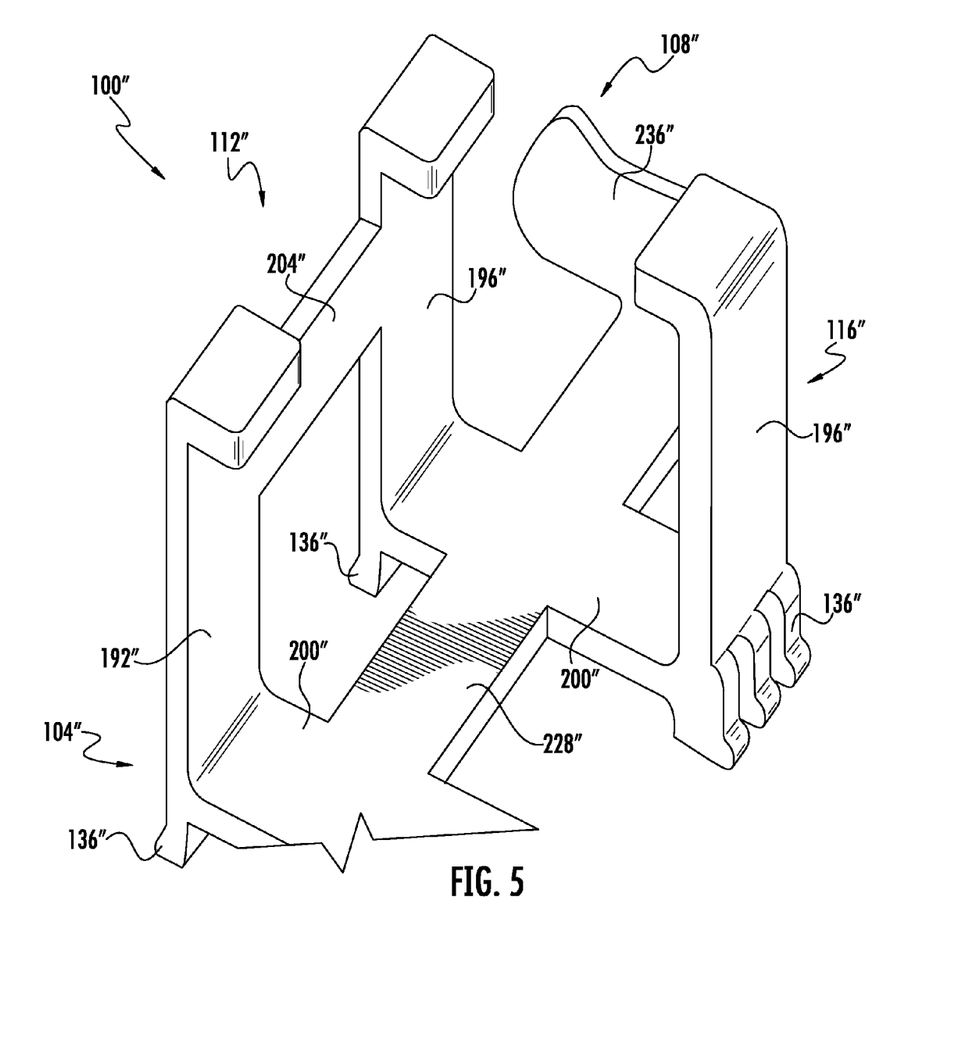
FIG. 5 is a partial top perspective view of another embodiment of a single piece benchtop power tool support frame.

Turning now to FIG. 5, another support frame 100" is shown with a configuration substantially similar to that of support frame 100'. The feet 136" of support frame 100" are formed as curved, finger shaped elements which project outwardly and downwardly from the front support members 192" and the rear support members 196". The support frame 100" can include a central bottom support member 228" connecting the two bottom support members 200" arranged at the front 104" and the rear 108" of the support frame 100". The support frame 100" can also include at least one horizontal support member 204" formed on at least one of the left and right sides 112", 116". The support frame 100" can also include at least one extension portion 236" configured to protect accessories and elements being stored within the support frame 100".

Figure 6:
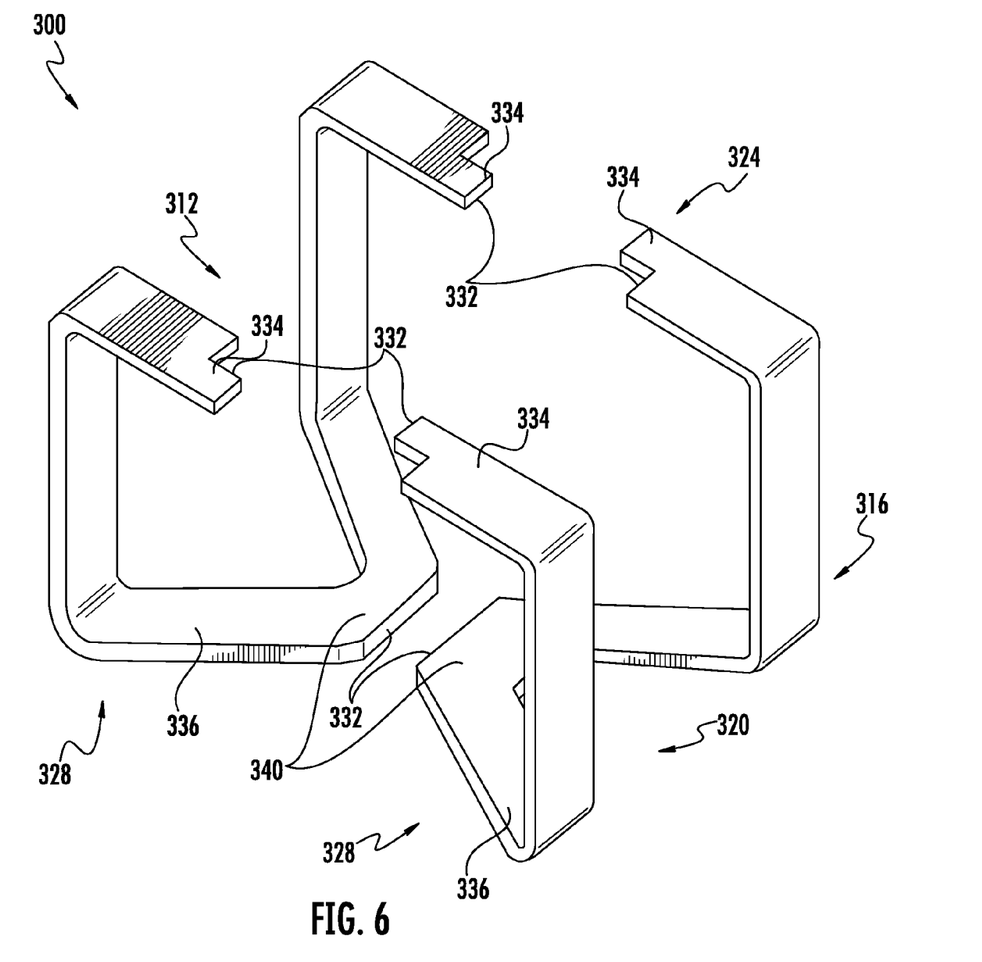
FIG. 6 is a partially exploded top perspective view of a benchtop power tool support frame including two separate pieces.

FIG. 6 depicts another embodiment of a support frame 300, which is substantially similar to the support frames 100, 100', and 100" in structure and function. However, the support frame 300 is made up of two identical pieces 328 instead of the single pieces which make up the benchtop power tool support frames 100, 100', and 100" shown in FIGS. 1-5 and described above. In this embodiment, each identical piece 328 has a simple shape which can be interlockingly attached to the other identical piece 328. For example, the identical pieces 328 can be formed with interlocking edges 332 which are coupled together by, for example, snapping, locking, or press-fitting, to enable the identical pieces 328 to form the support frame 300. Note that in the embodiment shown in FIG. 6, the identical pieces 328 are identical except for the interlocking edges 332, which are complementary. However, in an alternative embodiment, the interlocking edges 332 can be formed to be identical and still interlocking.

Each identical piece 328 of the support frame 300 includes a "V" shaped support member 336 which is flat along the bottom 320 of the support frame 300, bends upwardly where the bottom 320 intersects with the sides 312, 316 of the support frame 300, and then bends inwardly where the sides 312, 316 intersect with the top 324 of the support frame 300. The interlocking edges 332 are formed at an apex 340 of the "V" shape on the bottom 320 of the support frame 300 and at ends 344 of the "V" shape on the top 324 of the support frame 300. Accordingly, each identical piece 328 of the support frame 300 is coupled to the other identical piece 328 by interlocking the interlocking edges 332 at the apexes 340 and the ends 344 of the "V" shaped support members 336.

A possible advantage of forming the support frame 300 out of two identical pieces 328 is that the pieces 328 can be formed more easily than a single, unitary piece. Because each of the identical pieces 328 of the support frame 300 is smaller and simpler than the single, unitary pieces of support frames 100, 100', and 100", it may be easier to form two separate identical pieces and then couple those pieces together than to form the support frame out of a single, unitary piece.

Figure 7:
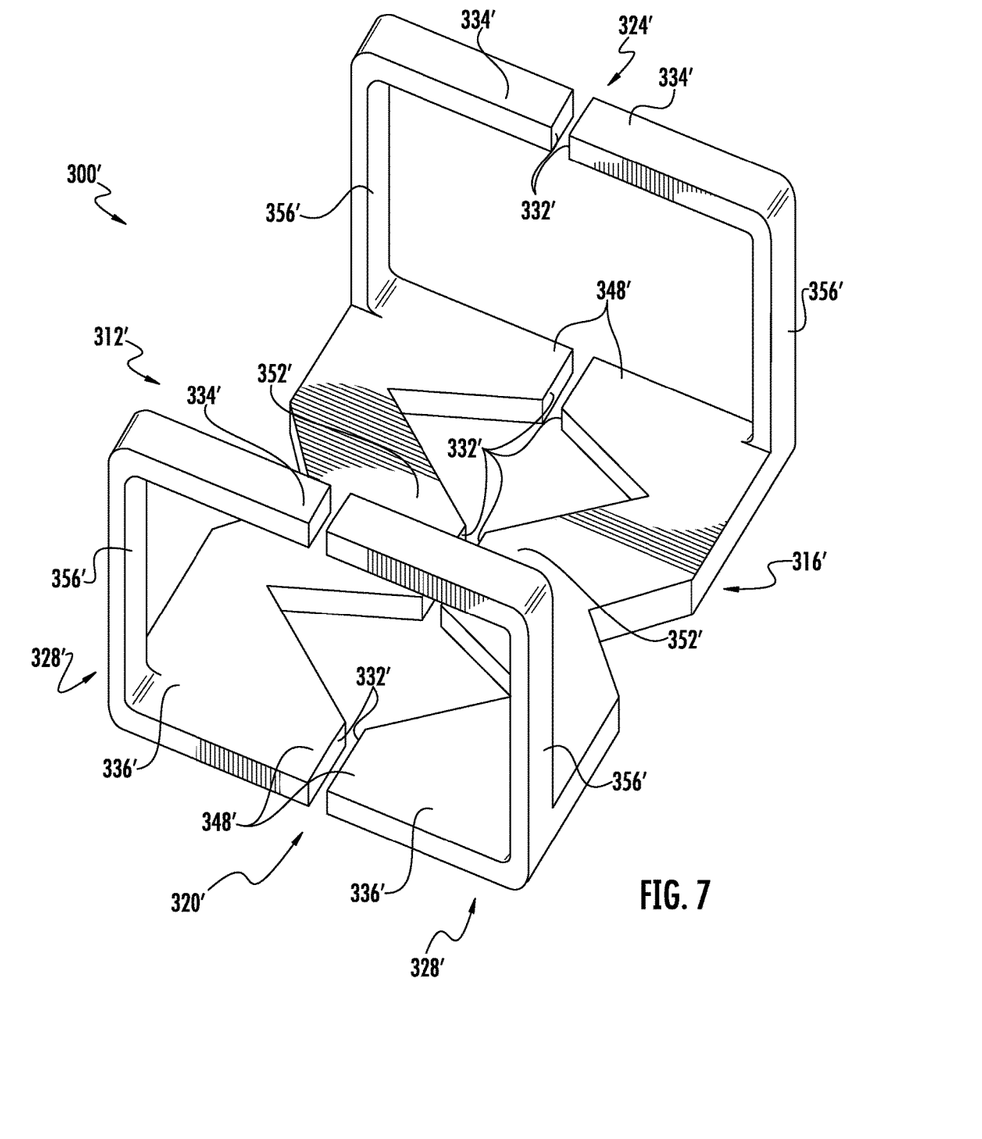
FIG. 7 is a partially exploded top perspective view of another embodiment of a benchtop power tool support frame including two separate pieces.

FIG. 7 depicts an alternative embodiment of a support frame 300' formed with two identical pieces 328'. In this embodiment, each identical piece 328' includes an "M" shaped support member 336, wherein the "M" shape is formed on the bottom 320' of the support frame 300' with interlocking edges 332 formed at each of the bottom ends 348' and the bottom apex 352' of the "M" shapes. The support frame 300' also includes support members 356' which extend upwardly from top apexes 360' of the "M" shapes. The support members 356' bend inwardly at the top 324' of the support frame 300', and interlocking edges 332' are formed at the ends 334' of the support members 356'. Accordingly, each identical piece 328' of the support frame 300' is coupled to the other identical piece 328' by interlocking the interlocking edges 332' at the bottom ends 348' and bottom apexes 352' of the "M" shapes and interlocking the interlocking edges 332' at the ends 334' of the support members 356'.

Figure 8:
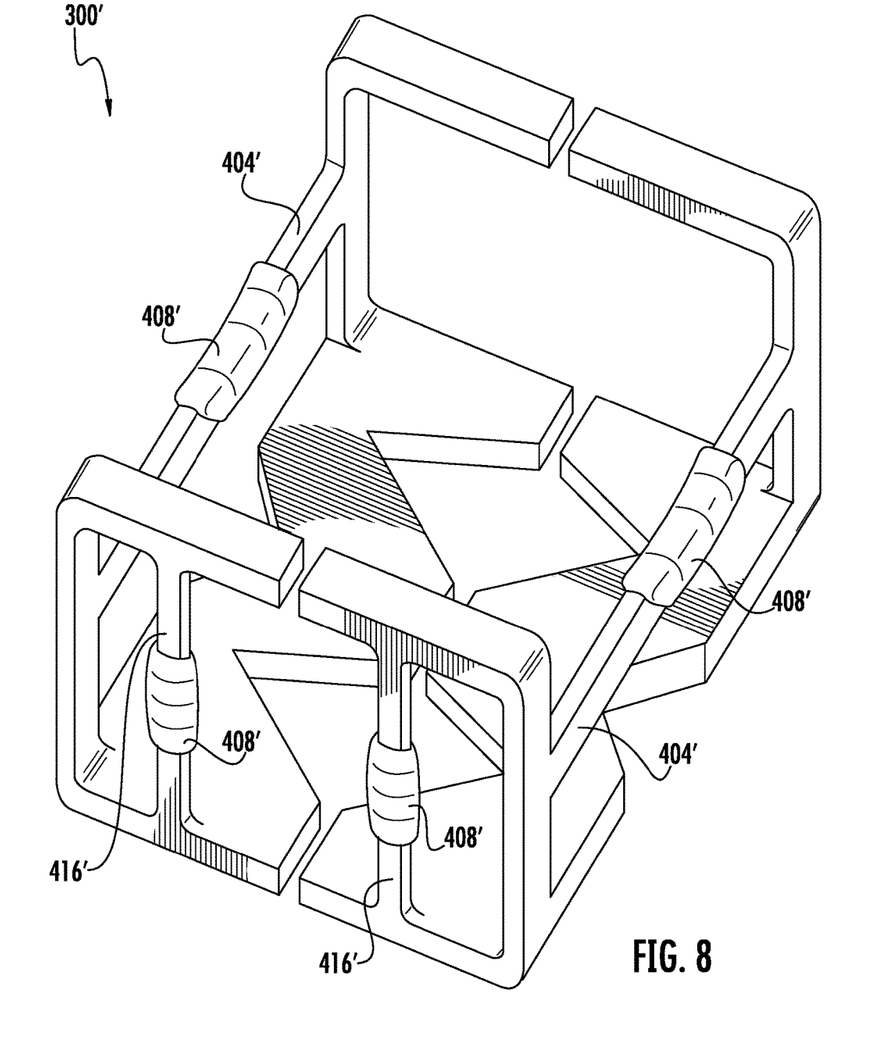
FIG. 8 is a partially exploded top perspective view of another embodiment of a benchtop power tool support frame including two separate pieces.

FIG. 8 depicts an alternative embodiment of the support frame 300' of FIG. 7 wherein the support frame 300' further includes horizontal support members 404' formed on the left and right sides 312', 316' of the support frame 300' and vertical support members 416' formed at the front 304' of the support frame 300'. These horizontal support members 404' and vertical support members 416' are substantially similar to the horizontal support members 204 and vertical support members 216, respectively, shown in FIGS. 1-3 and described above. Additionally, the horizontal support members 404' and vertical support members 416' include handles' 408 substantially similar to the handles 208, shown in FIGS. 1-3 and described above. FIG. 8 thus serves as an illustration of how features of these different embodiments can be combined and integrated together without changing the function or scope of the invention.

Figure 9:
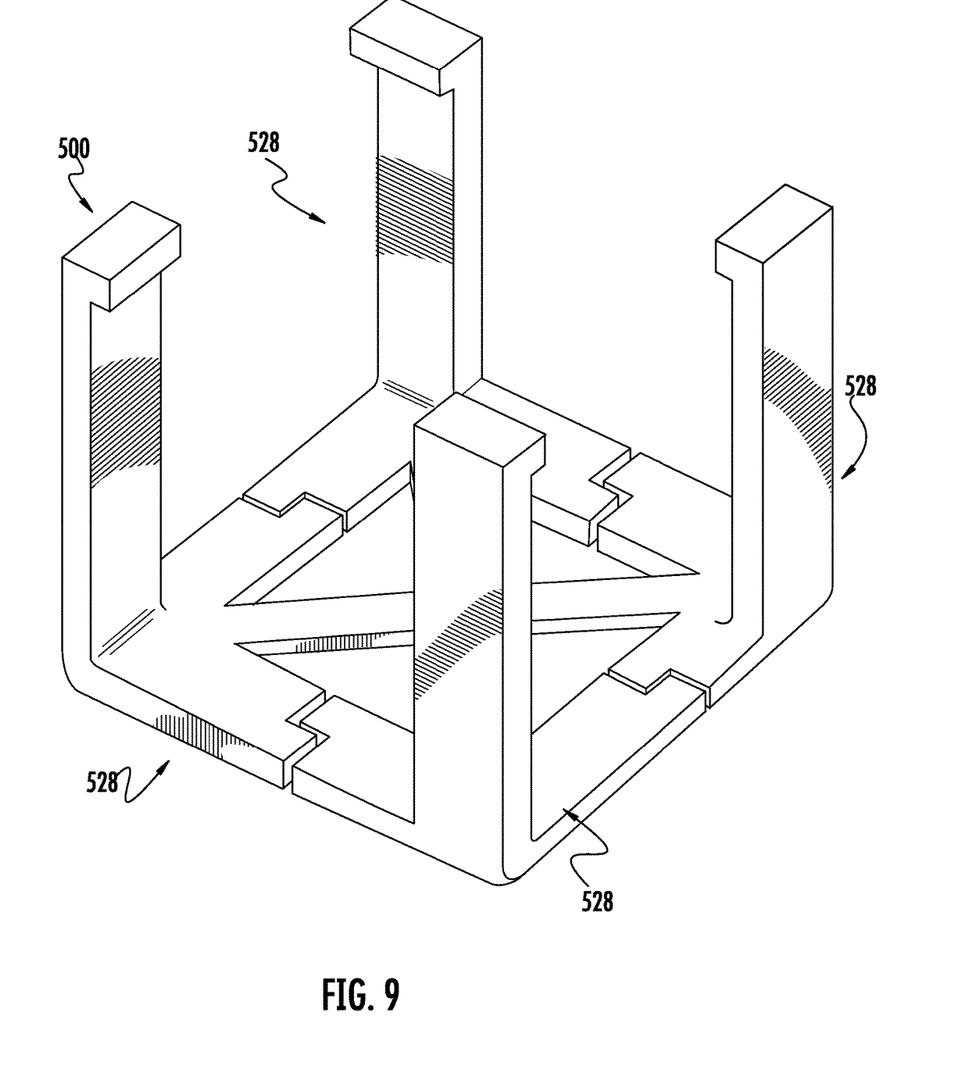
FIG. 9 is a top perspective view of a benchtop power tool support frame including four separate pieces.

FIG. 9 depicts an embodiment of a support frame 500 formed of four identical pieces 528. These four identical pieces 528 can be formed and coupled together in substantially the same manner as the two identical pieces 328 shown in FIGS. 6-8 and described above. One advantage of forming the support frame 500 out of four identical pieces 528 is that each piece 528 may be easier and less expensive to form than a single piece or two separate identical pieces.

Figure 10:
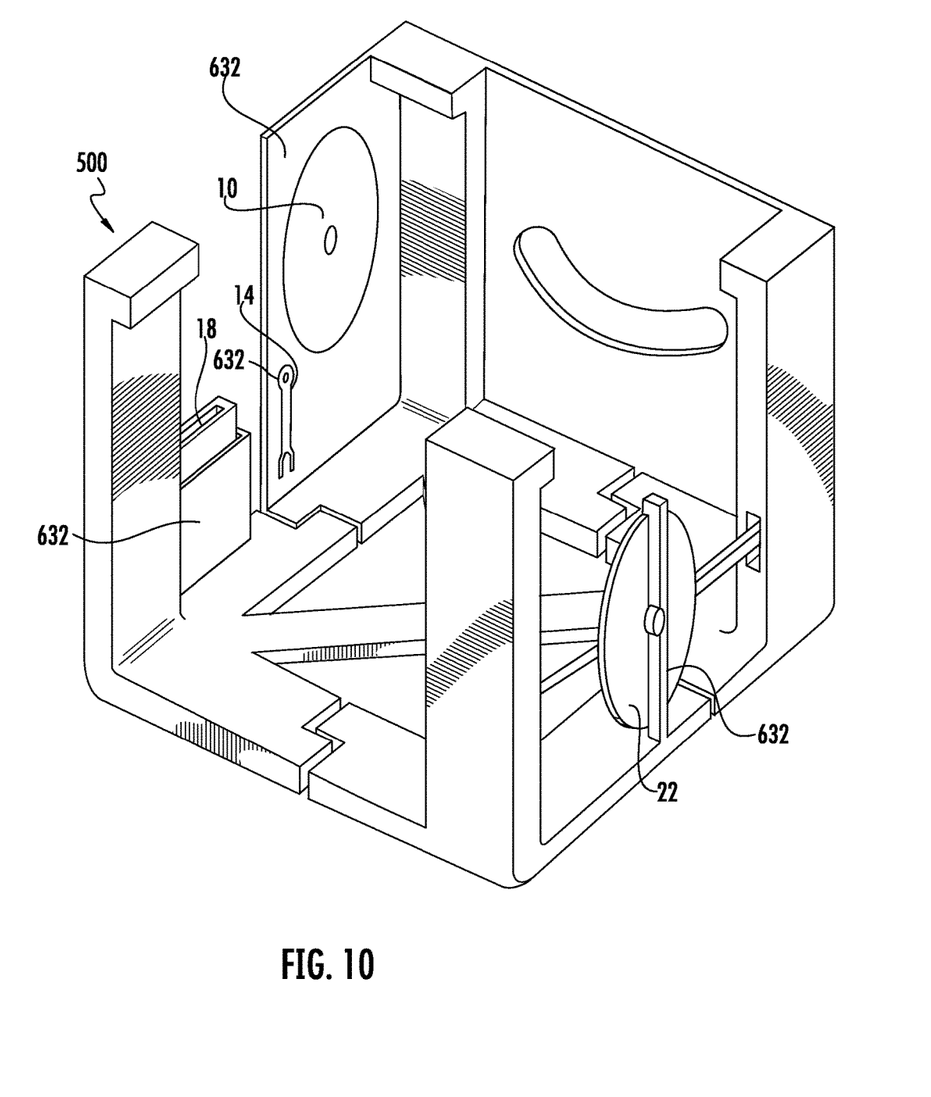
FIG. 10 is a top perspective view of the benchtop power tool support frame of FIG. 9, including retaining features.

FIG. 10 depicts the support frame 500 including a plurality of integrated retainers 632 formed in and between the support members. These integrated retainers 632 are substantially similar to the at least one integrated retainer 232' shown and described above with respect to the support frame 100' in that the integrated retainers 632 are also configured to retain accessories and other elements of a benchtop power tool assembly. The integrated retainers 632 can be configured to mate with portions of the accessories and elements of the assembly such that the accessories and elements do not become unintentionally separated from the support frame 500 and are less likely to be lost when storing or moving the assembly. For example, the integrated retainers 632 can be configured to retain a saw blade 10, a wrench 14, an instruction manual 18, and a miter gauge 22 for a power table saw.

Figure 11:
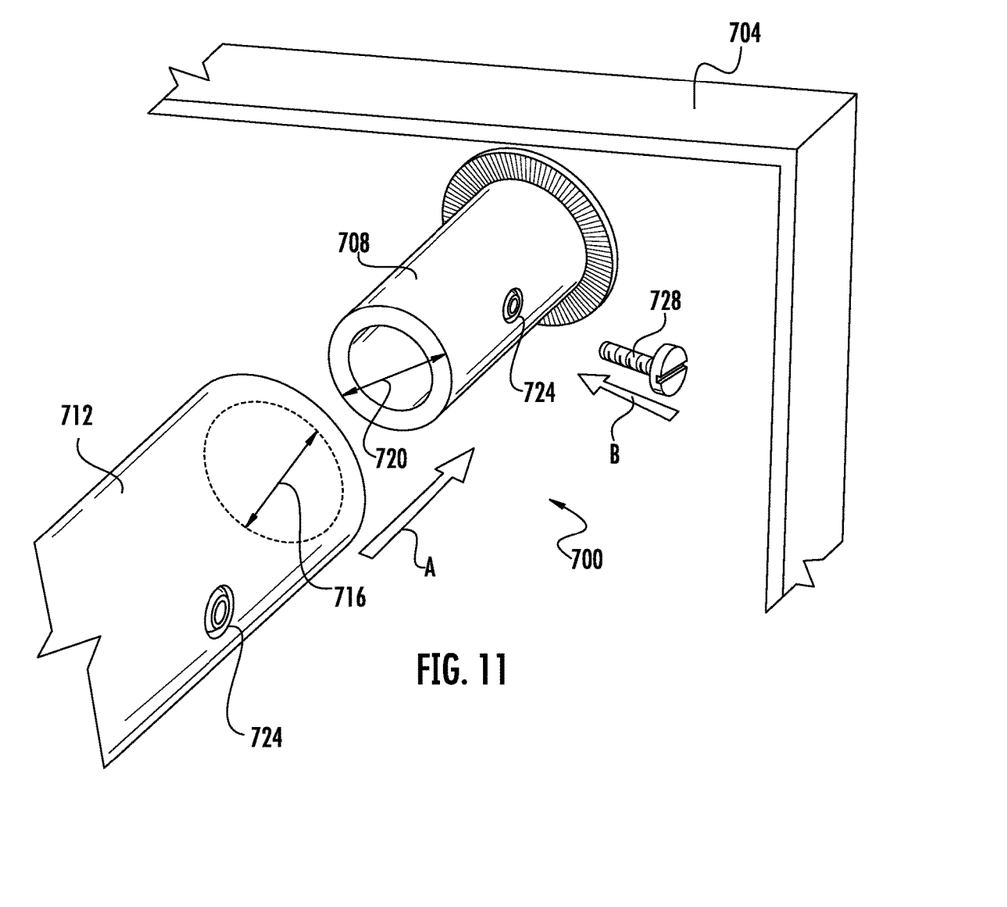
FIG. 11 is a partially exploded bottom perspective view of a connection mechanism configured to couple a portion of a benchtop power tool support frame to a table top.

FIG. 11 depicts a coupling mechanism 700 for coupling any one of the support frames 100, 100', 100", 300, 300', and 500 to a table top 704 of a benchtop power tool assembly. The coupling mechanism 700 includes an inside portion 708 coupled to or integrally formed with the table top 704 and an outside portion 712 coupled to or integrally formed with the table top supports 152 of the support frames. The inside portion 708 and the outside portion 712 are sized and configured such that the outside portion 712 can receive the inside portion 708 therein. For example, as shown, the outside portion 712 can be a hollow tube with an inner diameter 716 which is larger than an outer diameter 720 of the inside portion 708. Each of the inside portion 708 and the outside portion 712 includes an opening 724 arranged such that when the inside portion 708 is received within the outside portion 712, the openings 724 are aligned with one another. The coupling mechanism 700 further includes a coupling fastener 728 configured to be received in the openings 724 in both the inside portion 708 and the outside portion 712 to couple the table top 704 to the table top supports 152 of the support frames. For example, the openings 724 and the coupling fastener 728 can be threaded such that the openings 724 can threadably receive the coupling fastener 728 therein.

In this embodiment, to couple the table top 704 to one of the frames, the outside portion 712 is fitted onto the inside portion 708 by aligning the outside portion 712 with the inside portion 708 and moving the outside portion 712 in the direction of arrow A. Once the inside portion 708 is received within the outside portion 712, the coupling fastener 728 is inserted into the openings 724 in the direction of arrow B. This coupling mechanism 700 and method of attaching the table top 704 to the frames is meant as an example only, and any other mechanism and method by which the table top is coupled to the benchtop power tool support frame also falls within the scope of this invention.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A support frame for a power tool, comprising:
a top configured to support a table top;
a bottom arranged opposite and parallel to the top and configured to support the support frame on a surface when the support frame is in a first position;
a side arranged between the top and the bottom and configured to support the support frame on the surface when the support frame is in a second position;
a further side arranged between the top and the bottom and configured to support the support frame on the surface when the support frame is in a third position;
a front arranged between and perpendicularly to the side and the further side; and
a back arranged between and perpendicularly to the side and the further side, wherein:
when the support frame is in each of the first position, the second position, and the third position, the table top is spaced apart from the surface,
the bottom has a bottom corner arranged where each of the front and the back intersects with each of the side and the further side, and
the support frame includes a foot arranged at each of the bottom corners, each foot including a curved surface which is convex in a direction facing away from the top.

2. The support frame of claim 1, wherein the further side is arranged opposite and parallel to the side.

3. The support frame of claim 1, wherein:
each foot includes an outward portion which extends in a direction away from one of the side and the further side, respectively;
each foot includes a downward portion which extends in a direction away from the bottom;
the curved surface of each foot extends between a respective outward portion and a respective downward portion.

4. The support frame of claim 3, wherein:
the curved surface of each foot extends along an arc that is greater than 90°.

5. The support frame of claim 3, wherein each foot includes at least one structural element formed on the curved surface and configured to increase a coefficient of friction between the curved surface and the surface.

6. The support frame of claim 1, wherein:
the top has a top corner arranged where each of the front and the back intersects with each of the side and the further side;
the support frame includes a support arranged at each of the top corners;
each support includes an upward portion which extends away from the support frame in a direction perpendicular to the top and the bottom; and
each support includes an inward portion which extends toward an opposite inward portion in a direction parallel to the front and the back.

7. The support frame of claim 6, wherein:
the inward portion of each support includes a flat surface facing away from the support frame and parallel to the top and the bottom; and
the table top is coupled to the flat surface of each of the supports.

8. The support frame of claim 6, wherein:
each top corner further includes a support post, each support post including:
a neck extending away from the support frame in a direction perpendicular to the side and the further side; and
a head extending from a corresponding neck opposite the support frame, each head including a flat outward surface which is parallel to the side and the further side.

9. The support frame of claim 8, wherein:
the flat outward surface of each of the heads is spaced apart from one of the side and the further side, respectively, at a first distance;
the curved surface of each of the feet meets the outward portion of each of the feet at an edge that is spaced apart from one of the side and the further side, respectively, at a second distance that is equal to the first distance.

10. The support frame of claim 9, wherein:
the table top extends beyond each of the side and the second side at a third distance that is smaller than the first distance.

11. A power tool, comprising:
a table top; and
a support frame, including:
a top configured to support the table top;
a bottom arranged opposite and parallel to the top and configured to support the support frame on a surface when the support frame is in a first position;
a side arranged between the top and the bottom and configured to support the support frame on the surface when the support frame is in a second position;
a further side arranged between the top and the bottom and configured to support the support frame on the surface when the support frame is in a third position;
a front arranged between and perpendicularly to the side and the further side; and
a back arranged between and perpendicularly to the side and the further side, wherein:
when the support frame is in each of the first position, the second position, and the third position, the table top is spaced apart from the surface,
the bottom has a bottom corner arranged where each of the front and the back intersects with each of the side and the further side, and
the support frame includes a foot arranged at each of the bottom corners, each foot including a curved surface which is convex in a direction facing away from the top.

12. The power tool of claim 11, wherein:
each foot includes an outward portion which extends in a direction away from one of the side and the further side, respectively;
each foot includes a downward portion which extends in a direction away from the bottom;
the curved surface of each foot extends between a respective outward portion and a respective downward portion.

13. The power tool of claim 12, wherein the curved surface of each foot extends along an arc that is greater than 90°.

14. The power tool of claim 11, wherein:
the top has a top corner arranged where each of the front and the back intersects with each of the side and the further side;
the support frame includes a support arranged at each of the top corners;

each support includes an upward portion which extends away from the support frame in a direction perpendicular to the top and the bottom; and each support includes an inward portion which extends toward an opposite inward portion in a direction parallel to the front and the back.

15. The power tool of claim 14, wherein:

the inward portion of each support includes a flat surface facing away from the support frame and parallel to the top and the bottom; and the table top is coupled to the flat surface of each of the supports.

16. The power tool of claim 14, wherein:

each top corner further includes a support post, each support post including:
- a neck extending away from the support frame in a direction perpendicular to the side and the further side; and
- a head extending from a corresponding neck opposite the support frame, each head including a flat outward surface which is parallel to the side and the further side.

\* \* \* \* \*